No. 751,135. PATENTED FEB. 2, 1904.
H. L. ALEXANDER.
YOKE.
APPLICATION FILED APR. 24, 1903.
NO MODEL. 2 SHEETS—SHEET 1.

Witnesses
Charles Morgan.

Inventor
H. L. ALEXANDER.
By Chandler & Chandler
Attorneys

No. 751,135. PATENTED FEB. 2, 1904.
H. L. ALEXANDER.
YOKE.
APPLICATION FILED APR. 24, 1903.
NO MODEL. 2 SHEETS—SHEET 2.
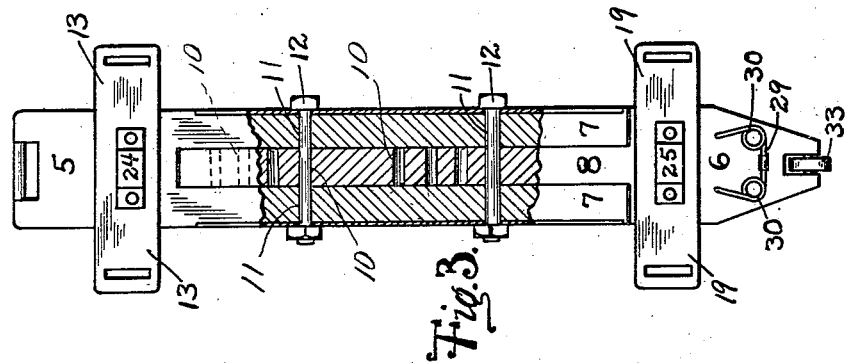
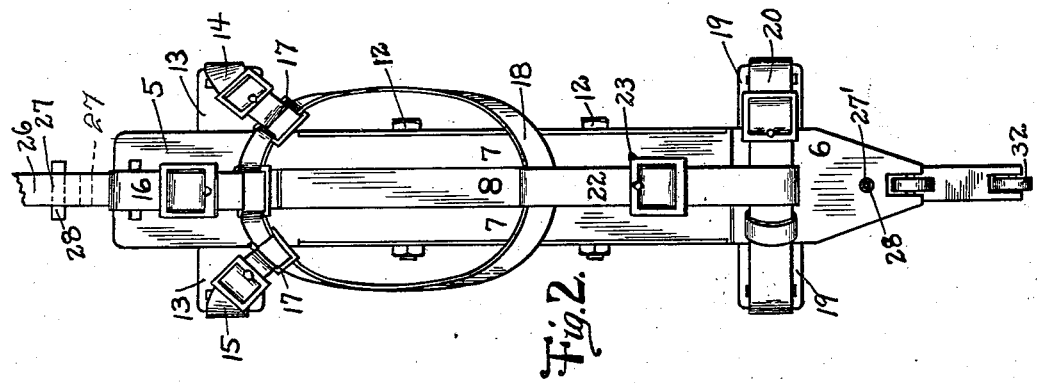
Witnesses
Charles Morgan.
Inventor
H. L. ALEXANDER.
By Chandlee & Chandlee
Attorneys No. 751,135.  
Patented February 2, 1904.

UNITED STATES PATENT OFFICE.

HENRY LEUROY ALEXANDER, OF BLACKLAND, MISSISSIPPI.

YOKE.

SPECIFICATION forming part of Letters Patent No. 751,135, dated February 2, 1904.

Application filed April 24, 1903. Serial No. 154,038. (No model.)

*To all whom it may concern:*

Be it known that I, HENRY LEUROY ALEXANDER, a citizen of the United States, residing at Blackland, in the county of Prentiss, State of Mississippi, have invented certain new and useful Improvements in Yokes; and I do hereby declare the following to be a full, clear, and exact description of the invention, such as will enable others skilled in the art to which it appertains to make and use the same.

This invention relates to animal yokes or pokes; and it has for its object to provide a device of this nature which may be secured to the head of the animal to prevent the latter from jumping fences and which may be adjusted to fit heads of different lengths.

A further object of the invention is to provide a device having a spike which will be forced into the nose of the animal and a lever for operating the spike and which lever may be adjusted to depend to a greater or lesser extent below the head of the animal.

Other objects and advantages of the invention will be understood from the following description.

Figure 1:
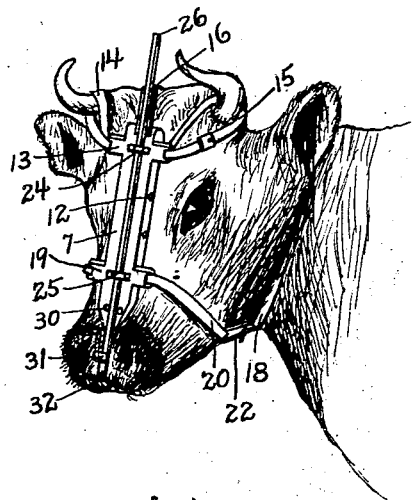
Figure 4:
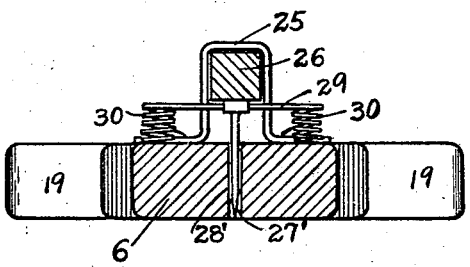

In the drawings forming a portion of this specification, and in which like numerals of reference indicate similar parts in the several views, Figure 1 is a perspective view showing the head of a cow with the yoke attached thereto. Fig. 2 is a rear elevation of the yoke detached and illustrating the securing-straps. Fig. 3 is a front elevation of the adjustable face-plate with the straps and the slidable pin-operating lever removed, the engaging portions of the sections of the face-plate being in section to illustrate the bolts. Fig. 4 is a transverse section through the lower portion of the face-plate and showing the arrangement of the spike and its operating-lever.

Referring now to the drawings, the present yoke includes what may be termed a "face-plate," including upper and lower sections 5 and 6, respectively, the body portion of the upper plate 5 being bifurcated to form spaced arms or members 7, between which is slidably received the narrowed body portion 8 of the member 6. These intermeshing or slidably-engaged portions are provided with transverse perforations 10 and 11 to receive bolts 12, and by alining the several perforations differently and engaging the bolts therewith the total length of the face-plate may be adjusted.

From the upper portion of the section 5 of the face-plate project lateral arms 13, through the ends of which are looped straps 14 and 15, having buckles, as illustrated, and which straps are in practice engaged around the horns of the animal, as illustrated, after the face-plate has been adjusted to the proper length and disposed against the face of the animal. Through the upper end of the section or member 5 is looped a third strap 16, having also a buckle, and these three straps are looped through the rings 17, which connects the sections 18 of a throat strap or collar 18, having also a buckle by means of which it is secured around the neck of the animal.

The lower section or member 6 of the face-plate has laterally-projecting arms 19, through which is passed a strap 20, having a buckle at one end for engagement with the opposite end of the strap, so that said strap may be doubled and passed around and behind the muzzle of the animal. A strap 22 is passed through the inclosure of the collar and muzzle strap and has its ends connected, by means of a buckle 23, to prevent the muzzle-strap from dropping from place.

Upon the sections or members 5 and 6 of the face-plate are guides 24 and 25, through which is slidably engaged a bar or lever 26, having transverse perforations 27 to receive a stop-pin 28, disposed for contact with the uppermost guide to limit the downward movement of the lever or bar. By shifting the pin to different perforations the degree of movement of the rod or lever may be varied.

Through the lower portion of the lower member 6 of the face-plate is a perforation 27', in which is slidably engaged a pin 28', connected to the transverse wire 29, the end portions of which are bent to form helixes 30 and are then engaged with the said member 6, so that when the transverse wire 29 is pressed rearwardly the pin will be forced through the perforation to prick the nose of the animal. When the wire is released, the helixes return it and raise the pin from the perforation, said wire being of spring material. The bar or lever 26 passes across and rests upon the wire 29 and has a slight rearward movement in its guides, so that it may be pressed rearwardly to operate the pin. At the lower end of the bar or lever 26 is a forwardly-directed finger 31, which will catch upon a fence when the animal attempts to rise upon its hind legs preparatory to jumping over the fence, and the bar will then be forced rearwardly against the wire 29 to operate the pin.

In order that the yoke may not interfere with grazing by the animal, the lower end of the bar or lever 26 is provided with a wheel 32, which will run over the ground to prevent the bar from catching in the ground. The lower end of the member 6 of the face-plate has also a roller 33 for the same purpose.

With this construction it will be seen that the device may be securely fastened to the head of the animal in such position that when the animal attempts to leap a fence its head will be held down and its nose will be pricked, causing the animal to desist.

It will be understood that in practice modifications of the specific construction shown may be made and that any suitable materials and proportions may be used for the various parts without departing from the spirit of the invention.

What is claimed is—

1. A device of the class described comprising a longitudinally-adjustable face-plate having attaching-straps, a pin mounted in the plate for movement into and out of engagement with the animal and a lever disposed to operate the pin and depending below the face-plate, said lever having a roller at its lower end.

2. A yoke comprising a longitudinally-adjustable face-plate having attaching-straps, a pin slidably mounted in the face-plate, means for holding the pin normally retracted, and an operating-lever for the pin slidably mounted upon the face-plate and depending normally therebelow.

3. A yoke comprising a face-plate including sections adjustably connected and having guides thereon, attaching-straps connected to the sections, the lower section having a roller at its lower end, a pin slidably engaged in the lower section and having means for holding it normally retracted, an operating-lever for the pin mounted in the guides and movable longitudinally and rearwardly therein, an adjustable stop for limiting the longitudinal movement of the lever, a roller at the lower end of the lever and a roller at the lower end of the face-plate.

In testimony whereof I affix my signature in presence of two witnesses.

HENRY LEUROY ALEXANDER.

Witnesses:
G. B. KIMBELL,
G. W. COLLINS.